(12) United States Patent
Barth et al.

(10) Patent No.: US 7,730,046 B2
(45) Date of Patent: Jun. 1, 2010

(54) NOMINATION LOCKING SYSTEM AND METHOD

(75) Inventors: Volker Barth, Bad Schoenborn (DE); Rudolf Hois, Dudenhofen (DE)

(73) Assignee: SAP AG, Walldorf (DE)

( * ) Notice: Subject to any disclaimer, the term of this patent is extended or adjusted under 35 U.S.C. 154(b) by 711 days.

(21) Appl. No.: 10/740,557

(22) Filed: Dec. 22, 2003

(65) Prior Publication Data
US 2004/0187121 A1    Sep. 23, 2004

Related U.S. Application Data

(60) Provisional application No. 60/435,279, filed on Dec. 23, 2002, provisional application No. 60/435,280, filed on Dec. 23, 2002, provisional application No. 60/435,351, filed on Dec. 23, 2002, provisional application No. 60/435,352, filed on Dec. 23, 2002.

(51) Int. Cl.
*G06F 7/00* (2006.01)
*G06F 17/00* (2006.01)

(52) U.S. Cl. ...................................................... 707/704
(58) Field of Classification Search .................. 707/8, 707/10, 201, 100, 200, 206, 687, 704, 802, 707/803; 711/164
See application file for complete search history.

(56) References Cited

U.S. PATENT DOCUMENTS

| | | | | |
|---|---|---|---|---|
| 5,008,853 A * | 4/1991 | Bly et al. | ..................... | 715/751 |
| 5,140,685 A * | 8/1992 | Sipple et al. | ................. | 711/164 |
| 5,333,316 A * | 7/1994 | Champagne et al. | ........... | 707/8 |
| 5,692,178 A * | 11/1997 | Shaughnessy | .................. | 707/8 |
| 5,734,909 A * | 3/1998 | Bennett | ...................... | 710/200 |
| 5,742,813 A * | 4/1998 | Kavanagh et al. | .............. | 707/8 |
| 5,930,794 A * | 7/1999 | Linenbach et al. | .......... | 707/100 |
| 6,012,094 A * | 1/2000 | Leymann et al. | ............. | 709/230 |
| 6,026,401 A * | 2/2000 | Brealey et al. | ................. | 707/8 |
| 6,247,025 B1 * | 6/2001 | Bacon | ........................ | 707/206 |
| 6,353,828 B1 * | 3/2002 | Ganesh et al. | .................. | 707/8 |
| 6,546,443 B1 * | 4/2003 | Kakivaya et al. | ............ | 710/200 |
| 6,681,226 B2 * | 1/2004 | Bretl et al. | ...................... | 707/8 |
| 6,708,195 B1 * | 3/2004 | Borman et al. | .............. | 718/102 |
| 6,823,337 B2 * | 11/2004 | Armstrong et al. | ............. | 707/8 |
| 6,850,938 B1 * | 2/2005 | Sadjadi | .......................... | 707/8 |
| 2002/0138483 A1 * | 9/2002 | Bretl et al. | ...................... | 707/8 |
| 2003/0018490 A1 * | 1/2003 | Magers et al. | .................. | 705/1 |
| 2003/0179230 A1 * | 9/2003 | Seidman | ..................... | 345/750 |
| 2004/0267807 A1 * | 12/2004 | Barabas et al. | .......... | 707/103 R |

\* cited by examiner

*Primary Examiner*—Hung T Vy
(74) *Attorney, Agent, or Firm*—Kenyon & Kenyon LLP

(57) ABSTRACT

A method for locking a nomination item in a multi-user distribution scheduling system is provided. At least one nomination item, associated with a voyage, may be created and stored within a database. A lock object, associated with the nomination item, may be created to prevent concurrent modification of the nomination item. The nomination item may be modified and stored within the database, and then the lock object may be deleted.

17 Claims, 11 Drawing Sheets

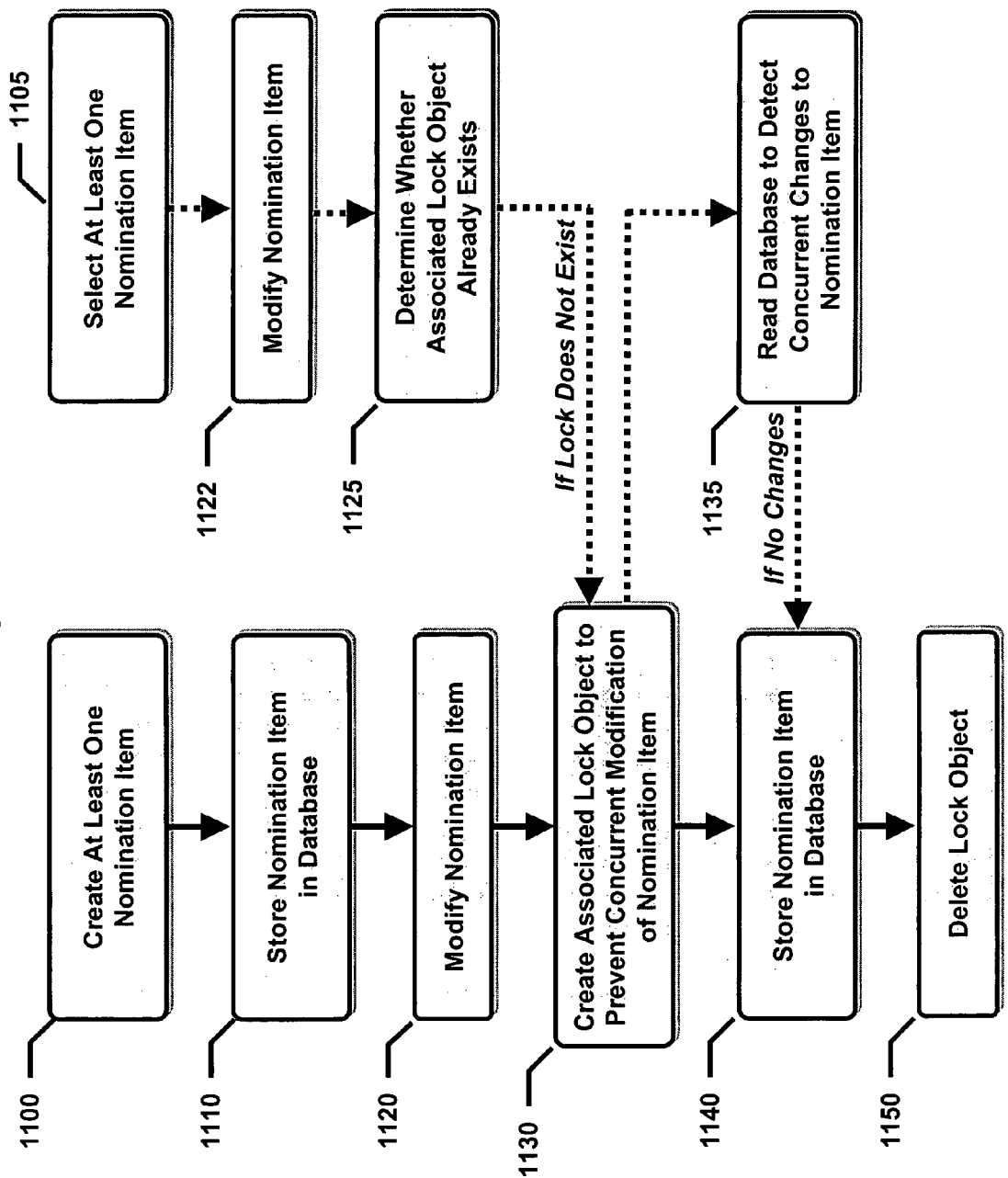

NOMINATION LOCKING SYSTEM AND METHOD

PRIORITY CLAIM/RELATED APPLICATION(S)

This patent application claims the benefit of four (4) U.S. Provisional Patent Applications: (1) Ser. No. 60/435,279, filed Dec. 23, 2002; (2) Ser. No. 60/435,280, filed Dec. 23, 2002; (3) Ser. No. 60/435,351, filed Dec. 23, 2002; and (4) Ser. No. 60/435,352, filed Dec. 23, 2002. These provisional patent applications are incorporated by reference herein in their entirety. This application is related to U.S. Nonprovisional Patent Application Ser. No. [TBD, Matter 402901], filed Dec. 22, 2003.

TECHNICAL FIELD

The present invention relates to nominations. More particularly, the present invention relates to a method for locking a nomination to preserve data integrity.

BACKGROUND OF THE INVENTION

The sale and distribution of any bulk material requires coordination between various participants, including buyers, sellers, transporters, etc. For example, distribution scheduling practice within the oil industry typically involves several participants and many steps. Traders make deals with buyers and sellers which result in purchase contracts and sales contracts, respectively. Freight contracts may also be in place between transporters, buyers and sellers. These various contracts may be captured on paper at a minimum, and, at best, memorialized within a computer-based contracts system. Additionally, purchase and sales contracts may be summarized in purchase and sales listings, respectively, identifying the essentials of each contract, such as partner name, location(s), material, quantities, dates, etc. Schedulers use these purchase and sales listings, combined with their own knowledge of potentially available transportation facilities, to attempt to build nominations, also known as voyages, directly on a one-by-one basis. The schedule of nominations is typically built using a simple spreadsheet program, such as Microsoft® Excel®, for example.

It is not unusual practice for the scheduler to manually enter the schedule of nominations into a second computer system, such as a mainframe, legacy system, messaging system, etc., for communication to all the relevant participants. Unfortunately, even though freight contacts may already be in place between the transporter, buyer and seller, the scheduler typically does not have access to electronic freight contract data, and, consequently, may need to manually enter freight information into the schedule of nominations based on his own personal knowledge or, if available, hardcopy printouts of freight contacts. Furthermore, the scheduler usually does not have an overview of the usage of the sales, purchase or freight contracts to date, other than information reflected by his own personal records. While participants may provide updated usage information related to sales, purchase or freight contracts, the scheduler typically reflects these updates only within the schedule of nominations at best, and not, for example, within the second computer system.

SUMMARY OF THE INVENTION

Embodiments of the present invention provide a method for locking a nomination item in a multi-user distribution scheduling system. At least one nomination item, associated with a voyage, may be created and stored within a database. A lock object, associated with the nomination item, may be created to prevent concurrent modification of the nomination item. The nomination item may be modified and stored within the database, and then the lock object may be deleted.

BRIEF DESCRIPTION OF THE DRAWINGS

FIG. 3 is a detailed diagram illustrating a data selection interface, according to an embodiment of the present invention.

FIGS. 5-8 are detailed diagrams illustrating an distribution scheduling interface, according to an embodiment of the present invention.

FIG. 11 is a top level flow diagram illustrating a method for locking a nomination item in a multi-user distribution scheduling system, according to an embodiment of the present invention.

DETAILED DESCRIPTION

Figure 1:
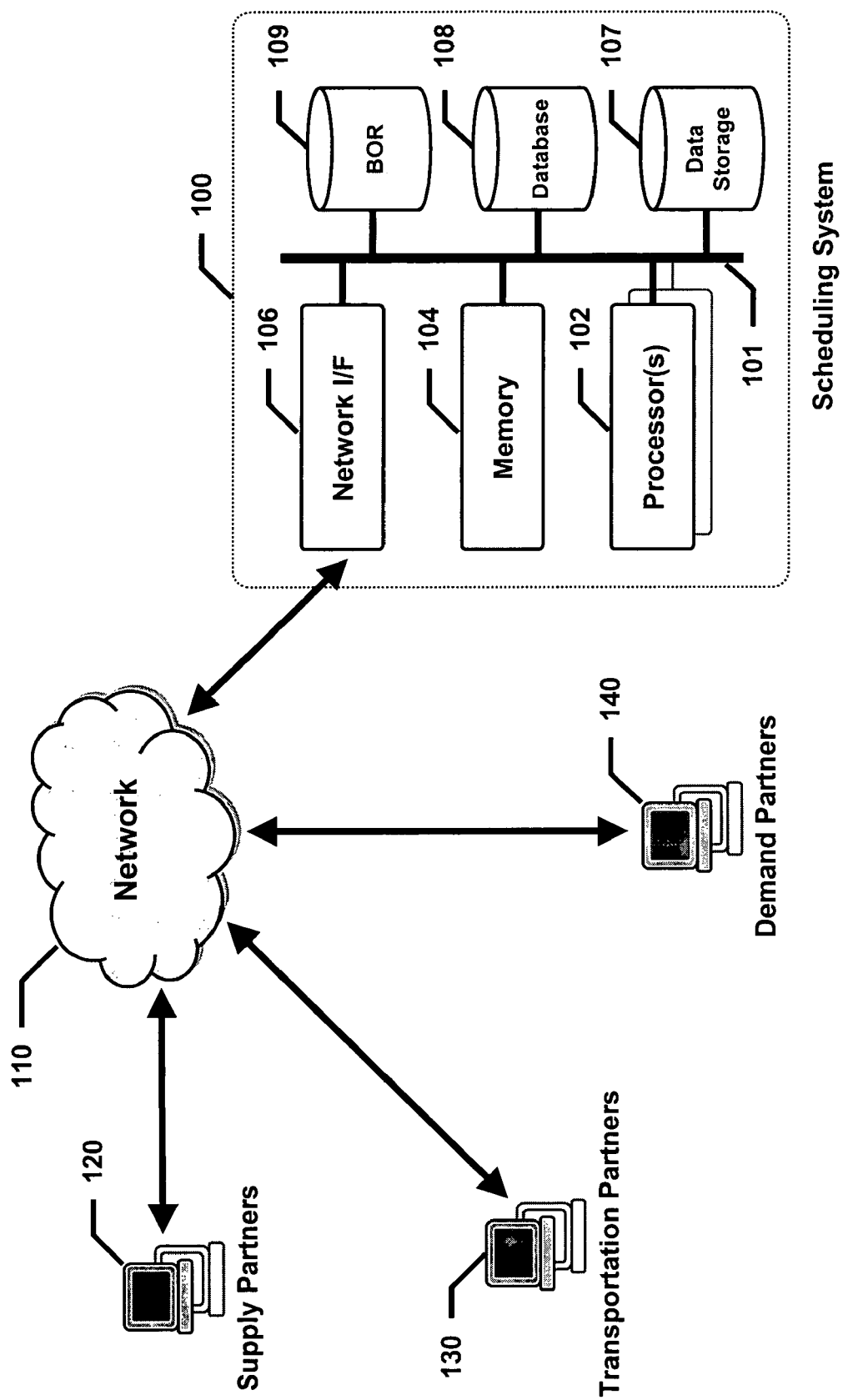
FIG. 1 is a system diagram of a distribution scheduling system, according to an embodiment of the present invention.

FIG. 1 is a diagram of a distribution scheduling system, according to an embodiment of the present invention. Scheduling system 100 may be coupled to network 110, which, in turn, may be coupled to several different partners, such as, for example, supply partners 120, transportation partners 130 and demand partners 140. Scheduling system 100 may present a graphical user interface to a scheduler to facilitate data entry, schedule creation, nomination communication, etc.

Network 110 may be any type of communications network, including, for example, a local area network (LAN), a wide area network (WAN), the Internet, the public switched telephone network (PSTN), a national or international telecommunications network, or any combination of wired or wireless communications networks. These networks and combinations of networks include intermediate destination points, e.g. switches, routers, gateways, etc., that receive and retransmit the information across the network. Network 110 may be, for example, a data communications network using Internet Protocol (IP), Transmission Control Protocol/Internet Protocol (TCP/IP), and/or HyperText Transfer Protocol (HTTP), a telecommunications network using Integrated Services Digital Network (ISDN) protocol, a wireless telecommunications network using Wireless Application Protocol (WAP), etc.

Data communications between scheduling system 100 and supply partners 120, transportation partners 130 and demand partners 140 may be bi-directional, i.e., information may be transmitted to, as well as received from, these partners over network 110. Various well-known authentication and data encryption techniques may be used to preserve an appropriate level of security in the public network context, including, for example, HTTPS (HyperText Transfer Protocol with Secure Sockets Layer), etc. These partners may communicate with scheduling system 100 though network 110 using networkenabled personal communication devices, such as, for example, desktop, notebook or laptop computers, pocket computers, personal digital assistants or PDAs, smart cellular phones, etc. These devices may also include a network interface to connect to network 110, such as, for example, a coaxial cable interface, a fiber-optic interface, a wireless network interface, etc.

Scheduling system 100 may include processor 102, memory 104, network interface (I/F) 106, general data storage 107, database 108 and, in an object oriented embodiment, business object repository (BOR) 109, interconnected through general system bus 101. Processor 102 may be a general purpose microprocessor, such as the Pentium V microprocessor manufactured by the Intel Corporation of Santa Clara, California, or an Application Specific Integrated Circuit ("ASIC") that embodies at least a part of the method, in accordance with embodiments of the present invention, in its hardware and/or firmware. Scheduling system 100 may also include multiple processors 102, as shown in phantom outline in FIG. 1.

Memory 104 may be any memory device adapted to store electronic information, such as, for example, data and instructions adapted to be executed by processor 102, including Random Access Memory (RAM), etc., while general data storage 107, database 108 and BOR 109 may be non-volatile, mass storage devices, such as, for example, hard disks, CD-ROM R/W, DVD-R, etc. In one embodiment, general data storage 107, database 108 and BOR 109 may be separate physical devices, while in another embodiment, general data storage 107, database 108 and BOR 109, may be accommodated within one, or more, physical devices.

Figure 2:
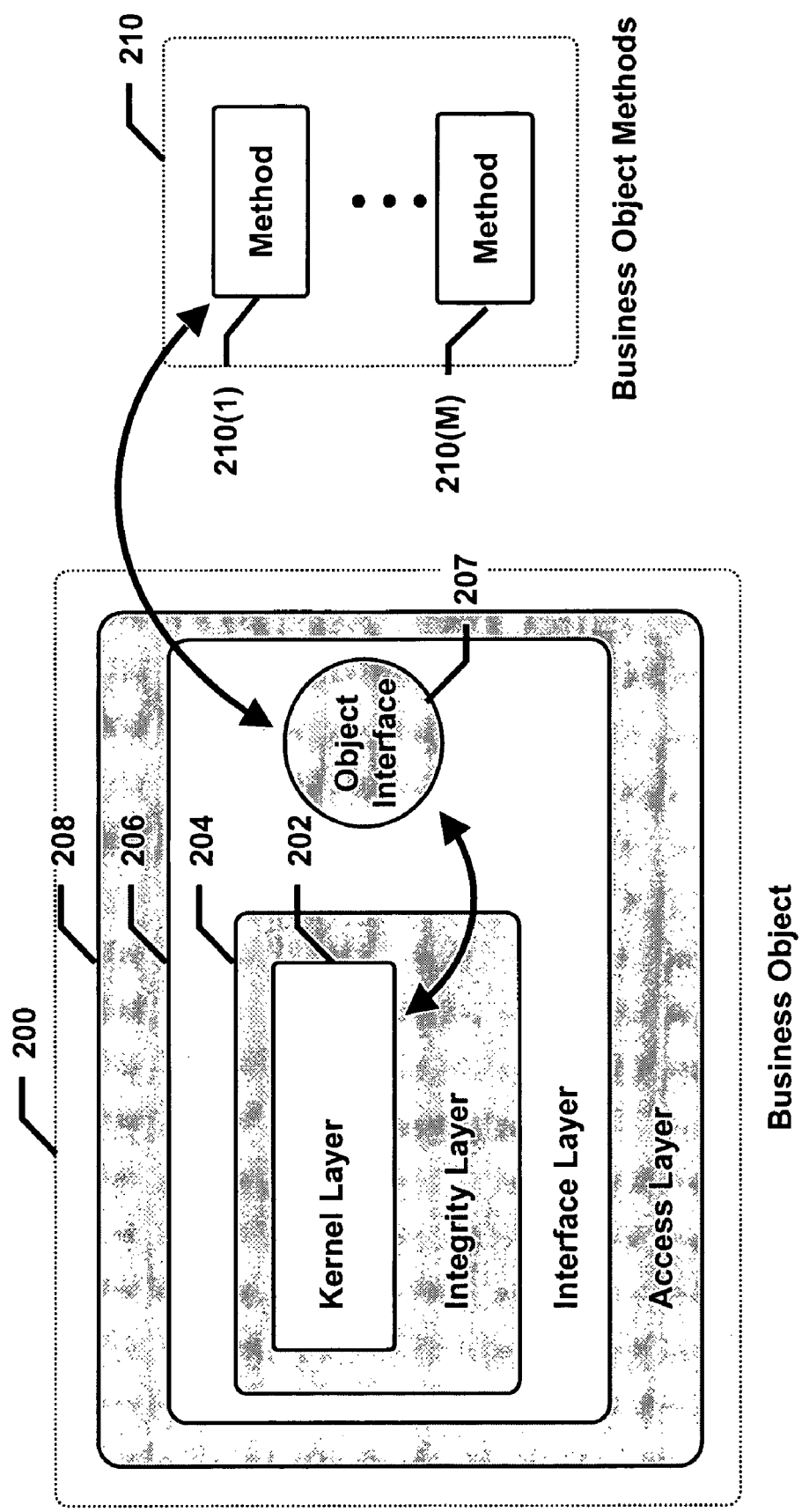
FIG. 2 is a detailed diagram illustrating a business object and associated business object interface, according to an embodiment of the present invention.

FIG. 2 is a detailed diagram illustrating a business object, according to an embodiment of the present invention.

Scheduling system 100 may include software components expressing the functionality and dependencies of various business processes and data, typically architected according to well-known object-oriented programming (OOP) methods and constructs. Generally, these software components may include application programs and databases, interface libraries, etc., developed, in many cases, using object-oriented software development tools, such as, for example, SAP Software Development Kit (SDK Version 6.2, manufactured by SAP AG of Walldorf, Germany), etc.

In an embodiment, scheduling system 100 may include a plurality of business objects which encapsulate various business methods and data, while hiding structure and implementation details from higher-level software components, such as, for example, business applications. Generally, business objects may include data definitions, methods, operational rules and constraints, access specifications, etc., that are particular to a specific business component, process, logical construct, etc. Various interfaces may be defined to provide access to the methods and data associated with a particular business object, such as, for example, business application programming interfaces, or "BAPIs".

Each business object may be created as an instance of a business object type. For example, each employee of a company may be represented by an instance of an Employee business object type. Business object types may be stored within a business object repository, such as, for example, BOR 109, etc., while business objects (also known as business object instances, object instances, objects, etc.) may be stored within a different database, such as, for example, database 108, etc. In an embodiment, business object 200 may include kernel layer 202, integrity layer 204, interface layer 206 and access layer 208.

Kernel layer 202 may include data inherently associated with business object 200. For example, an employee business object may include data representing an employee identification number, name, supervisor, business division, etc. Integrity layer 204 may include rules and constraints associated with the environment. Interface layer 206 may describe the implementation and structure of the various methods associated with business object 200, and may include one or more associated interfaces, such as, for example, business object interface 207. Access layer 208 may define various technologies that may be used to access business object 200, such as, for example, COM/DCOM (component object model/distributed component object model), RFC (remote function call), JAVA, CORBA (common object request broker architecture), etc.

In an embodiment, plurality of business object methods 210, i.e., business object method 210(1) ... 210(M), etc., may also provide access to, or operate upon, data defined within kernel layer 202 of business object 200. In this embodiment, plurality of business object methods 210 may be constructed as function modules compatible with the Remote Function Call (RFC) protocol. Each function module may also be associated with a corresponding business object interface, such as, for example, business object interface 207. Plurality of business object methods 210 may be stored within a business object repository, such as, for example, BOR 109, or, alternatively, plurality of business object methods 210 may be stored within a remote network database.

In an embodiment, scheduling system 100 may plan the distribution schedule of bulk oil or gas product using nominations. Various information may be stored within data storage 107 or database 108, such as, for example, material supply and demand quantities, locations and dates, transportation system capabilities and availabilities, scheduling and nomination information, etc. Additionally, information describing supply partners 120, transportation partners 130 and demand partners 140 may also be stored within data storage 107 or database 108. Information may be entered into scheduling system 100 manually, using one or more data input interfaces, or created by one or more processes executing on processor 102. In one embodiment, information associated with various oil or gas contracts, such as, for example, sales contracts, purchase contracts, freight contracts, etc., may be entered into scheduling system 100 to form the basic data set from which the distribution schedule may be created. In another embodiment, sales contract information, purchase contract information, freight contract information, etc., may be imported into scheduling system 100, via network 110, from one, or more, other systems, such as, for example, a trading deal capture system. Various processes may execute on processor 102 to plan the distribution schedule of bulk oil or gas product, such as, for example, high-level applications, low-level functions, remote function calls, etc.

In one embodiment, these data may be represented by various data structures, such as, for example, a supply item data structure, a demand item data structure, a transportation item data structure, a distribution schedule data structure, etc., and stored, generally, within data storage 107. In another embodiment, these data may be represented by various database tables and stored within database 108, such as, for example, a supply item table, a demand item table, a transportation item table, a distribution schedule table, etc. In a further embodiment, these data may be represented by various classes and stored within data storage 107, or database 108, as instances of these classes, such as, for example, a supply item class, a demand item class, a transportation item class, a distribution schedule class, etc.

In yet another embodiment, these data may be represented by several different types of business objects, such as, for example, supply objects, demand objects, transportation objects, distribution schedule objects, etc., each defined by their corresponding business object type. Business object types may be stored within BOR 109, for example, while business object instances, or, more simply, business objects or objects, may be stored within database 108.

A supply object may include information associated with a particular quantity of oil or gas provided by a supply partner, such as, for example, a supply partner identifier, location identifier, material type, quantity, available dates, sales contract references, etc. Similarly, a demand object may include information associated with a particular quantity of oil or gas required by a demand partner, such as, for example, a demand partner identifier, location identifier, material type, quantity, available dates, purchase contract references, etc. A transportation object may include information associated with a particular transportation medium (e.g., marine vessel, train, pipeline, etc.) provided by a transportation partner, such as, for example, a vehicle identifier, owner identifier, location identifier(s), material type(s), capacity, available dates, freight contract references, etc. A distribution schedule object may include schedule information, such as, for example, a nomination identifier, vehicle identifier, scheduled quantity, supply partner identifier, demand partner identifier, transport partner identifier, nomination dates, geographic location data, etc.

Figure 3:
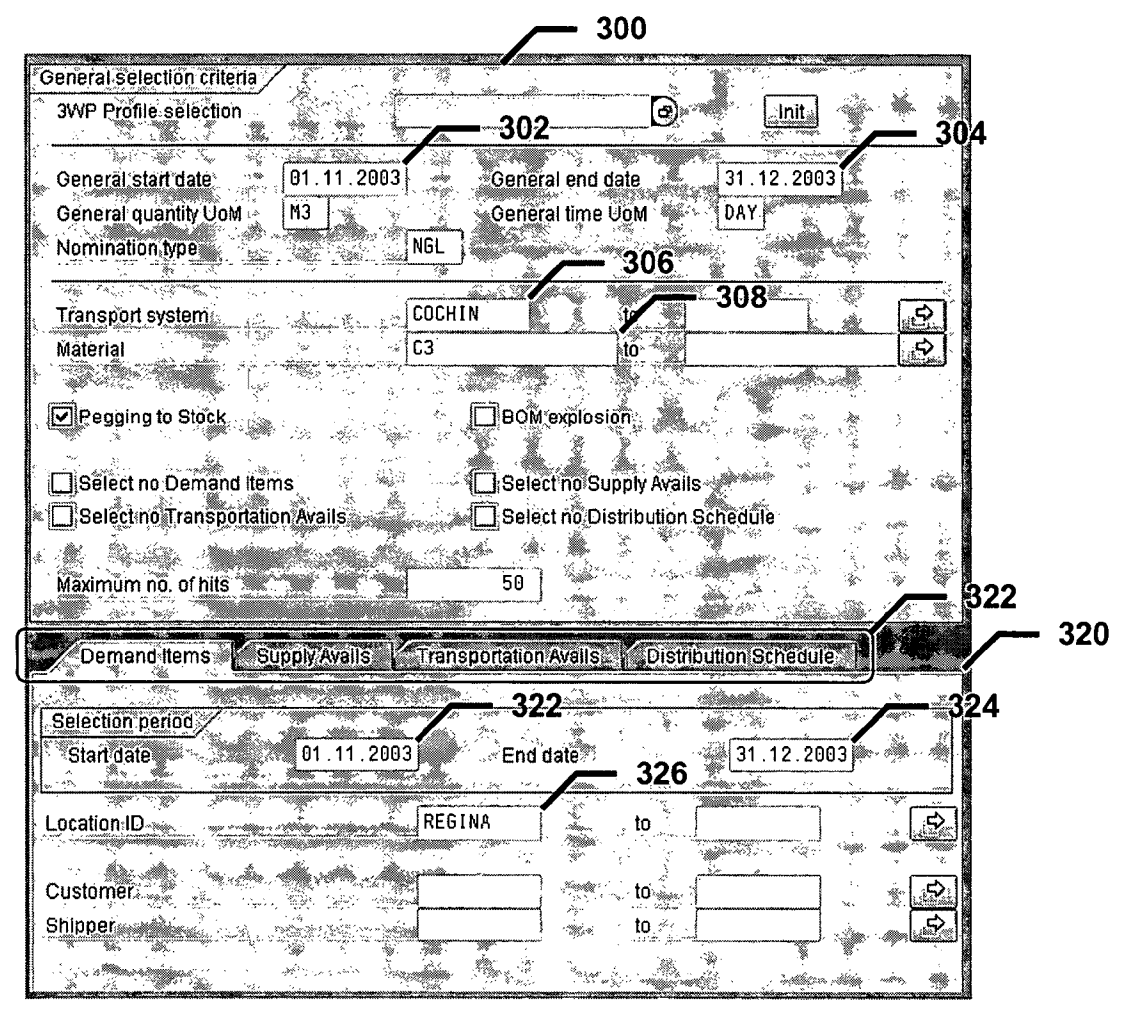

FIG. 3 is a detailed diagram illustrating a data selection interface, according to an embodiment of the present invention.

Generally, sales, purchase and freight information, initially entered into scheduling system 100, may form a data set from which a distribution schedule may be created. In an embodiment, these data may be stored within database 108 as business objects, as described above. Accordingly, database 108 may contain supply objects, demand objects and transportation objects, as well as other types of objects or data. In one embodiment, the creation of a particular distribution schedule may begin with the identification of available resources. For example, distribution schedules are typically planned for a particular period of time bounded by a start date and an end date. Supply objects, demand objects and transportation objects, stored within database 108, may be identified as available objects, in part, based on temporal availability information stored within each object, i.e., the start date and end date during which time the resource is available. Other criteria, such as material type, geographic location, etc., may also be included in the identification of available resources.

For example, supply object start and end dates may represent the period of time during which oil or gas product is available for transportation from a particular location. Similarly, demand object start and end dates may represent the period of time during which oil or gas product is desired to be delivered to a particular location. Supply and demand objects may represent production facilities, storage facilities, refineries, etc. Transportation object start and end dates may represent the period of time during which the transportation resource is available for use. For example, a transportation object representing a train may include start and end dates defining the period of time during which the train is available for use, as well as location information describing the geographic extent of the train services (i.e., the rail line). Of course, marine vessels offer different geographic availability than trains, trains offer different geographic availability than pipelines, etc.

In an embodiment, general selection window 300 and tabbed selection window 320 may be presented to a scheduler to select available resources. General selection window 300 may include various selection criteria, such as, for example, general start date 302, general end date 304, transport system 306 and material 308. Tabbed selection window 320 may include several tabs 322 to select individual demand, supply, transportation and distribution schedule selection windows. The demand selection window, depicted in FIG. 3, may include demand start date 322, demand end date 324, location identifier 326, as well as other selection information.

The supply selection window (not shown for clarity) may include similar data, such as supply start and end dates, location identifier, as well as other selection information. The transportation selection window (also not shown for clarity) may include transportation start and end dates, location identifier, transportation mode, transportation carrier, shipper, vehicle reference, as well as other selection information (e.g., minimum availability, nomination relevance period, remaining capacity, etc.). The distribution schedule selection window (also not shown for clarity) may include various criteria controlling the creation, scope, etc., of the distribution schedule, such as schedule start and end dates, location identifier, vehicle identifier, nomination identifier, shipper, vendor, etc.

The scheduler may enter general selection criteria within general selection window 300, and then enter resource-specific information within tabbed selection window 320 by sequentially selecting tabs 322, labeled "Demand Items," as "Supply Avails," "Transportation Avails" and "Distribution Schedule," respectively, and then entering the appropriate demand, supply, transportation and distribution schedule information, as desired.

Figure 4:
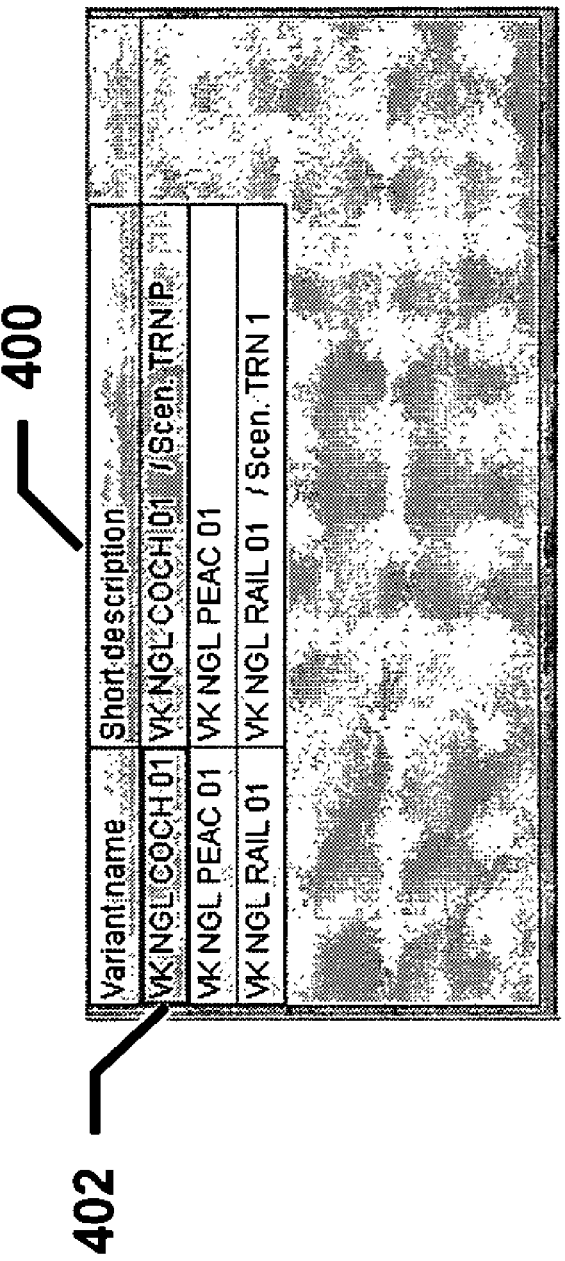
FIG. 4 is a detailed diagram illustrating a variant selection interface, according to an embodiment of the present invention.

FIG. 4 is a detailed diagram illustrating a variant selection interface, according to an embodiment of the present invention.

In an embodiment, the scheduler may be presented with variant selection window 400 to facilitate the selection of available resources. In this embodiment, general, demand, supply, transportation and distribution schedule selection information may be stored within database 108 as a variant. Selection of variant 402, for example, will automatically populate general selection window 320 and each tabbed resource selection window 320.

Using the selection information, scheduling system 100 then searches database 108 to determine available resources, such as, for example, available supply objects, available demand objects, available transportation objects, etc. As noted above, search constraints may include dates, locations, material types, etc. The search may be instantiated, for example, in response to a command selected by the scheduler. In one embodiment, a distribution scheduling interface may then be presented to the scheduler.

FIGS. 5-8 are detailed diagrams illustrating a distribution scheduling interface, according to an embodiment of the present invention.

Figure 5:
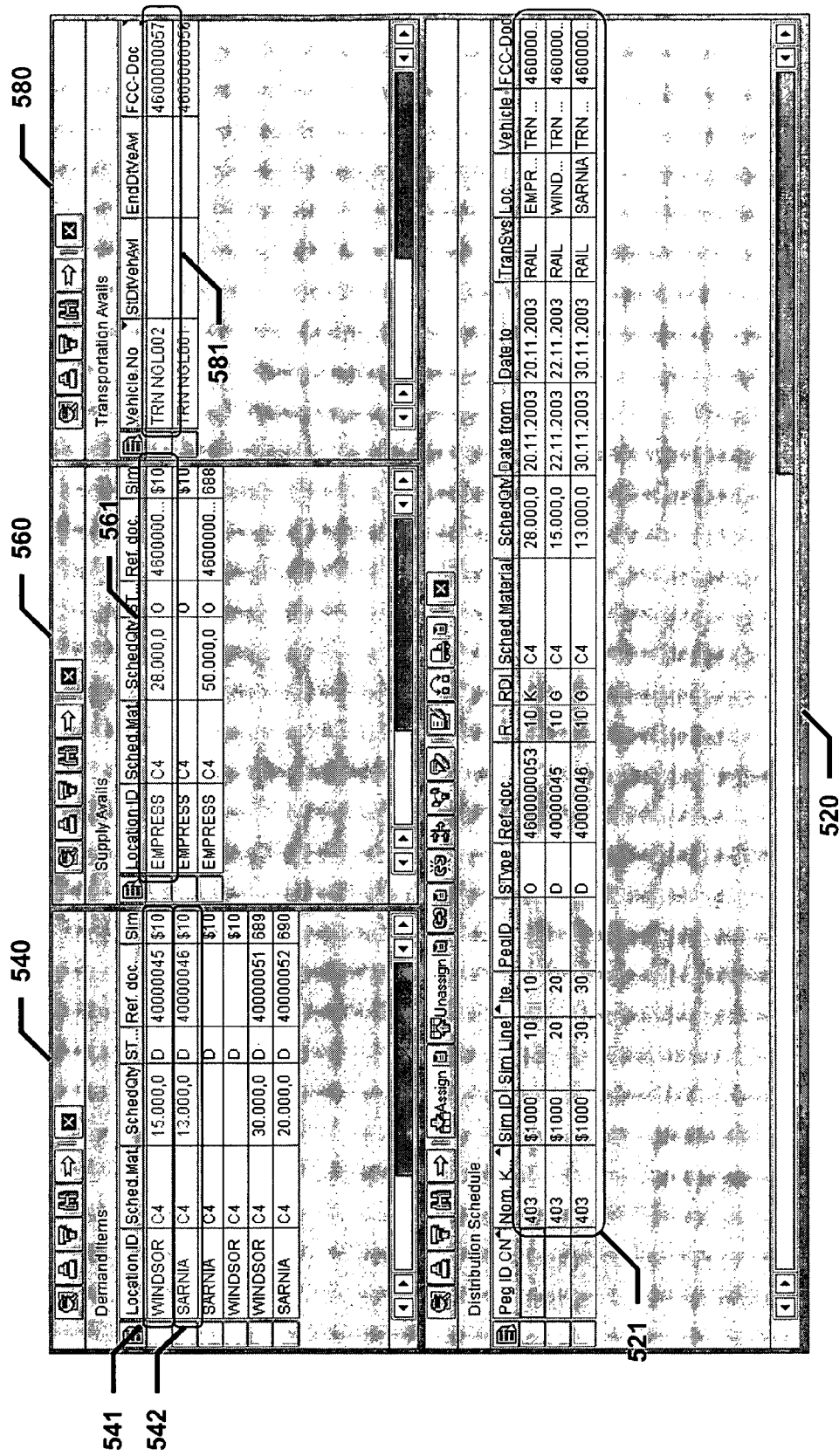

Referring to FIG. 5, in an embodiment, distribution scheduling interface 500 may include, for example, distribution schedule window 520, demand window 540, supply window 560 and transportation window 580, as well as other windows or interface elements not shown for clarity. In one embodiment, available demand objects may be presented within demand window 540, and a subset of each available demand object's data may be displayed therein, such as, for example, a location identifier, a material type, a scheduled quantity, a reference document identifier (e.g., a purchase contract identifier), etc. Similarly, available supply objects may be presented within supply window 560, and a subset of each available supply object's data may be displayed therein, such as, for example, a location identifier, a material type, a quantity, a reference document identifier (e.g., a sales contract identifier), etc.

Both contract and stock positions may be represented by demand and supply objects. For example, a sales contract may specify that a particular quantity (e.g., 28,000 barrels) of light crude (e.g., material type C4) may be available at a specific location (e.g., EMPRESS), as represented by supply avail 561. Similarly, one or more purchase contracts may specify that a quantity of light crude may be required at one or more specific locations. For example, demand item 541 may specify that 15,000 barrels of material type C4 is required to be provided at WINDSOR, while demand item 542 may specify 13,000 barrels of material type C4 is required to be provided at SARINA. Stock positions may also be represented as well. For example, a supply object may define a particular quantity of available material stored in a tank farm, a demand object may define a particular quantity of material desired to be added to a tank farm, etc.

In one embodiment, available transportation objects may be presented within transportation window 580, and a subset of each available transportation object's data may be displayed therein, such as, for example, a vehicle number, vehicle availability start and end dates, a reference document identifier (e.g., a freight contract identifier), etc. For example, transportation avail 581 may specify that train "TRN NGL002" may be available under freight contract identifier "4600000057" and has the capacity to transport a specific quantity of material (assumed to be greater than the total demand items and supply avails for the purposes of illustration only; real trains are, of course, capacity-limited and would be constrained accordingly). In this example, supply avail 561, demand item 541 and demand item 542 are geographically-linked to a transportation system upon which transportation avail 581 may operate.

In one embodiment, distribution schedule window 520 may display information describing voyages associated with the available demand, supply and transportation objects. Accordingly, a schedule object may include information identifying the demand, supply and transportation objects forming the voyage, as well as other information (e.g., nomination information, etc.). For example, voyage 521 may include supply avail 561, demand item 541, demand item 542 and transportation avail 581. Supply avail 561, demand item 541 and demand item 542 may be represented by rows within voyage 521, while transportation avail 581 may be identified by one or more columns, such as, for example, "Vehicle" and "FCC-Doc" columns (i.e., vehicle identifier and freight contract document identifier columns, respectively). Nomination key "403" may refer to a nomination object created after the voyage has been scheduled. In this example, a single available transportation object was used for voyage 521; however, a portion of the transportation object's capabilities, or multiple transportation objects, may also be used. The construction of a voyage to distribute 30,000 barrels of C4 material from the EMPRESS location to the WINDSOR location using TRN 001 is described in more detail below.

Figure 6:
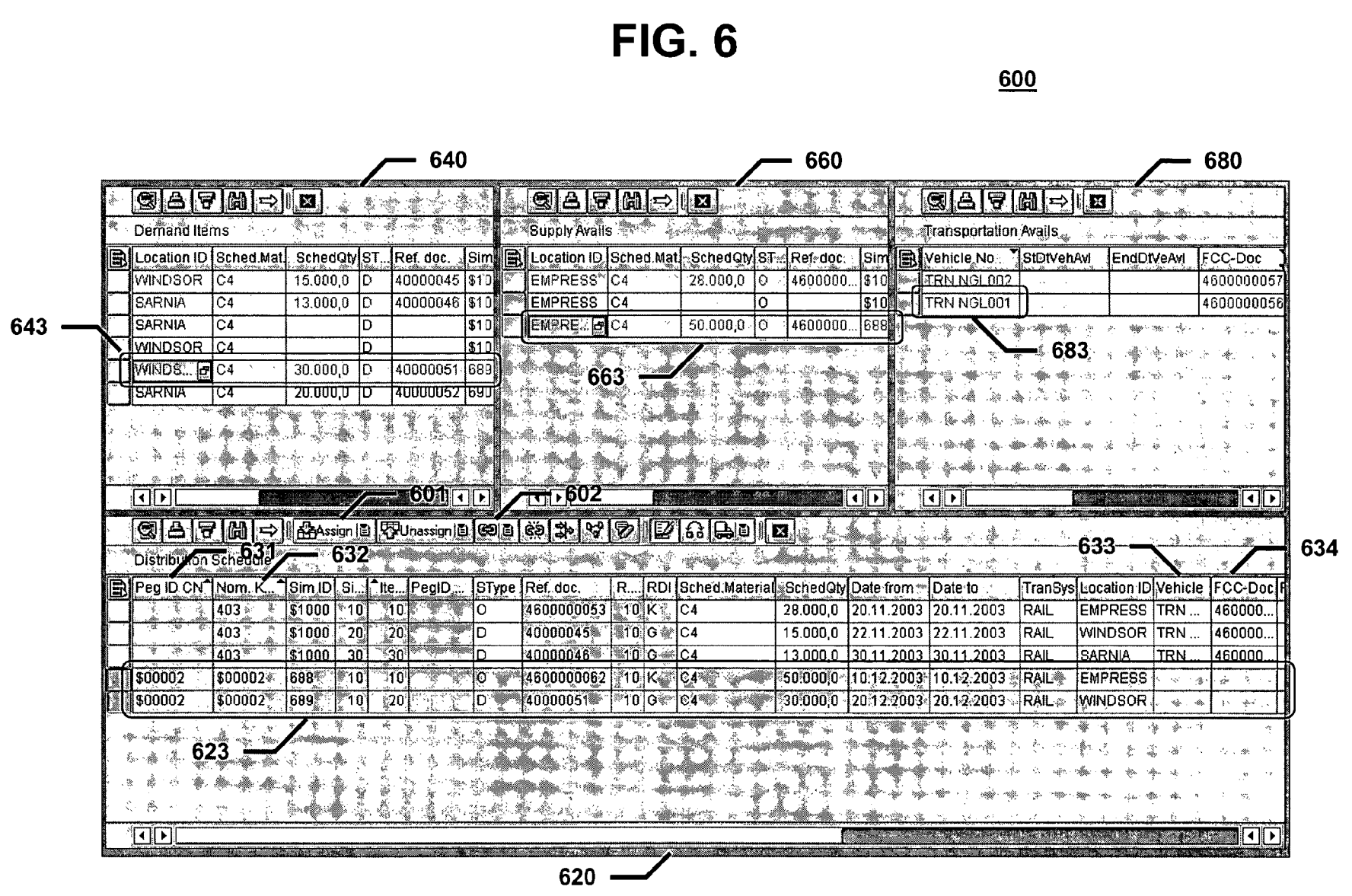

Referring to FIG. 6, distribution scheduling interface 600 may include, for example, distribution schedule window 620, demand window 640, supply window 660 and transportation window 680, similar to the embodiment depicted, generally, within FIG. 5. In one embodiment, a supply object and a demand object may be pegged to create a voyage. For example, demand item 643 specifies that 30,000 barrels of C4 material (e.g., light crude) is to be delivered to the WINDSOR location under contract reference "40000051," as depicted in demand window 640. The scheduler may first select this demand item, and then review the available supply objects, depicted within supply window 660, to determine whether a single supply object includes a sufficient quantity of C4 material to fulfill the requirements of demand item 643. In this example, supply avail 663 specifies that 50,000 barrels of C4 material may be available at the EMPRESS location under contract reference "4600000062," and, consequently, may fulfill the requirements of demand item 643.

Accordingly, supply avail 663 may be selected by the scheduler. In one embodiment, the scheduler may then review the available transportation objects, depicted within transportation window 680, to determine whether a transportation object may be capable of transporting the material. In another embodiment, the selected demand and supply objects may be pegged to a voyage first, and the quantities balanced, if desired, and then the transportation object may be selected and pegged to the existing voyage. The latter embodiment is discussed in further detail below.

Manual pegging icon 601 may be selected by the scheduler, and, in response, scheduling system 100 may peg, or assign, demand item 643 to supply avail 663 to create a voyage having an associated schedule object, depicted, for example, as voyage 623 within distribution schedule window 620. Scheduling system 100 may also create a simulated pegging identifier (e.g., "$00002") and a simulated nomination key (e.g., "$00002") for voyage 623, as depicted within the Peg ID CN 631 and Nom Key 632 columns of distribution schedule window 620. These identifiers may be amended during the subsequent nomination process. Demand-supply pegging icon 602 may also be selected by the scheduler, and, in response, scheduling system 100 may peg demand item 643 to supply avail 663, within voyage 623, to represent loading, actualization, or other contractual requirements.

The schedule object may be stored within database 108. In an embodiment, scheduling system 100 may perform data checks to ensure consistency between the selected supply and demand objects (e.g., material type, available dates, etc.). For example, the transport system specified for each object may be checked to ensure that the demand location and the supply location have a common means of transportation (i.e., that it is physically possible to transport the supply material to the demand location). It may be noted that a transportation object has not yet been assigned to voyage 623, as indicated, for example, by the blank entries within the vehicle field of each row (e.g., vehicle identifier 633).

In some cases, the demand and supply quantities may be equal, in which case no additional quantity balancing would be required. However, and as presented within this example, the demand quantity and the supply quantity are not equal (i.e., 50,000 barrels supplied but only 30,000 barrels demanded). In one embodiment, one or more additional demand items may be assigned to voyage 623 to balance the total supply quantity. In another embodiment, voyage 623 may be completed as currently assigned, which may result in the delivery of 20,000 barrels of excess material to the demand location (i.e., WINDSOR), or the loss of scheduling availability for these 20,000 barrels of material at the supply location (i.e., EMPRESS). Unfortunately, either of these results may create inefficiencies within scheduling system 100.

In a further embodiment, supply avail 663 may be initially entered as a plurality of smaller supply objects, such as, for example, five supply objects each having a quantity of 10,000 barrels. In this embodiment, three of these supply objects may be selected to match the 30,000 barrel quantity specified by demand item 643. In yet another embodiment, scheduling system 100 may split supply avail 623 into two, or more, supply parcels, as required and at the appropriate time in the scheduling process. Of course, the total quantity split among the supply parcels remains the same as the original supply object, i.e., supply avail 663.

Figure 7:
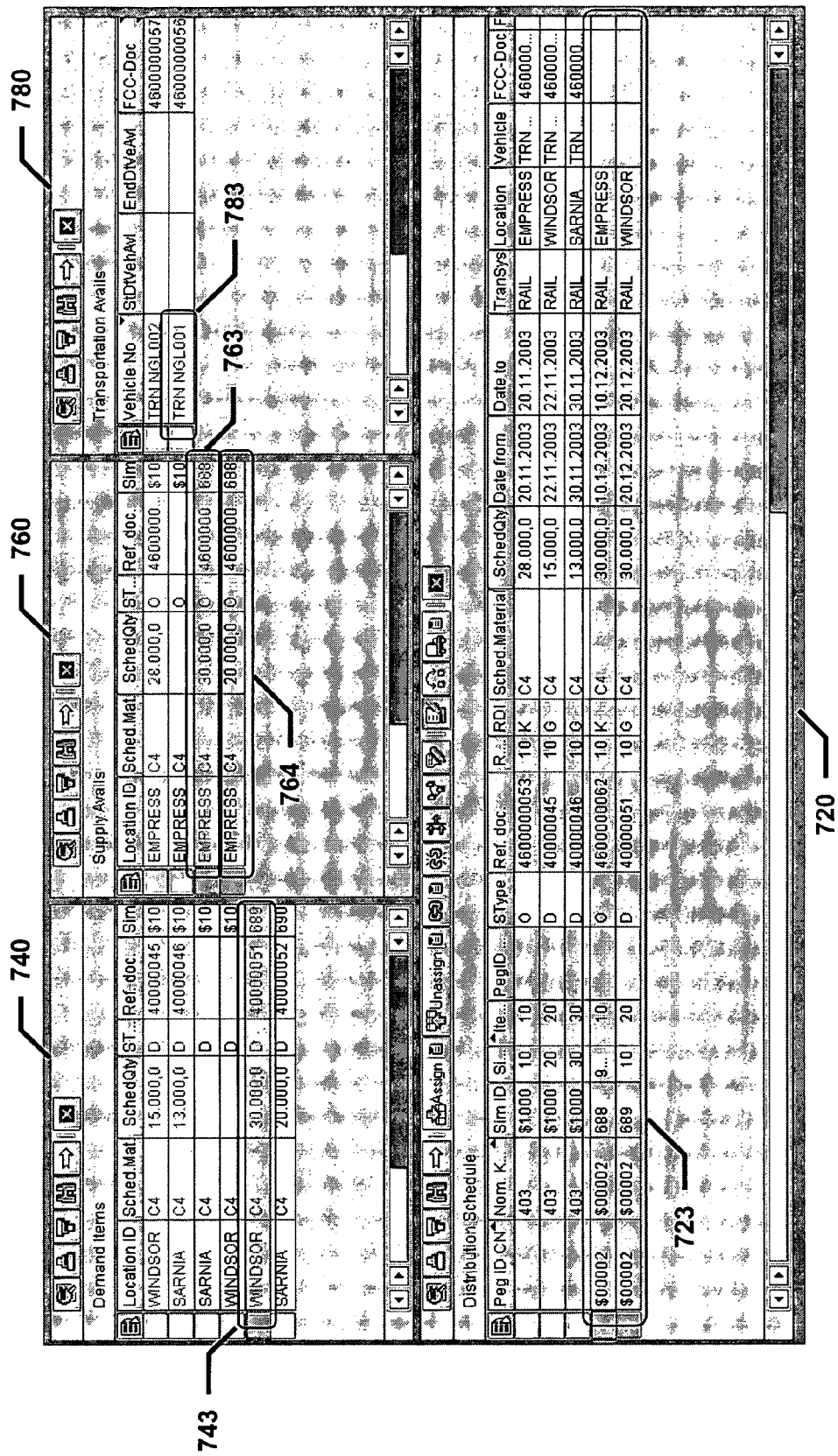

Referring to FIG. 7, distribution scheduling interface 700 may include, for example, distribution schedule window 720, demand window 740, supply window 760 and transportation window 780, similar to the embodiments depicted, generally, within FIGS. 5-6. In one embodiment, supply avail 663 may be split into supply avail 763 and supply avail 764 by entering the desired quantity into the quantity field of supply avail 663, such as, for example, entering 30,000 in place of 50,000 within supply window 660. Scheduling system 100 may recognize this entry as a request to split supply avail 663 into two supply parcels, resulting in supply avail 763 and supply avail 764 having quantities of 30,000 and 20,000 barrels, respectively, as depicted within supply window 760.

In one embodiment, supply avail 763 and supply avail 764 may be separate supply objects stored within database 108, while in another embodiment, supply avail 763 and supply avail 764 may represent a single supply object stored within database 108, in which the appropriate parcel information may be stored. After splitting supply avail 663 into supply avail 763 and supply avail 764, scheduling system 100 may then reflect the new quantity associated with supply avail 763, i.e., 30,000 barrels, within voyage 723. In one embodiment, the quantity associated with supply avail 763 may be considered to be a consumed portion, while the quantity associated with supply avail 764 may be considered to be an open portion. The quantities associated with supply avail 763 and demand item 743 are now equal, and the remaining 20,000 barrels may be available (i.e., "open") for scheduling purposes once more (i.e., supply avail 764). Parcels may be re-combined as well, allowing the scheduler to easily reconstruct a previous pegging scenario.

Figure 8:
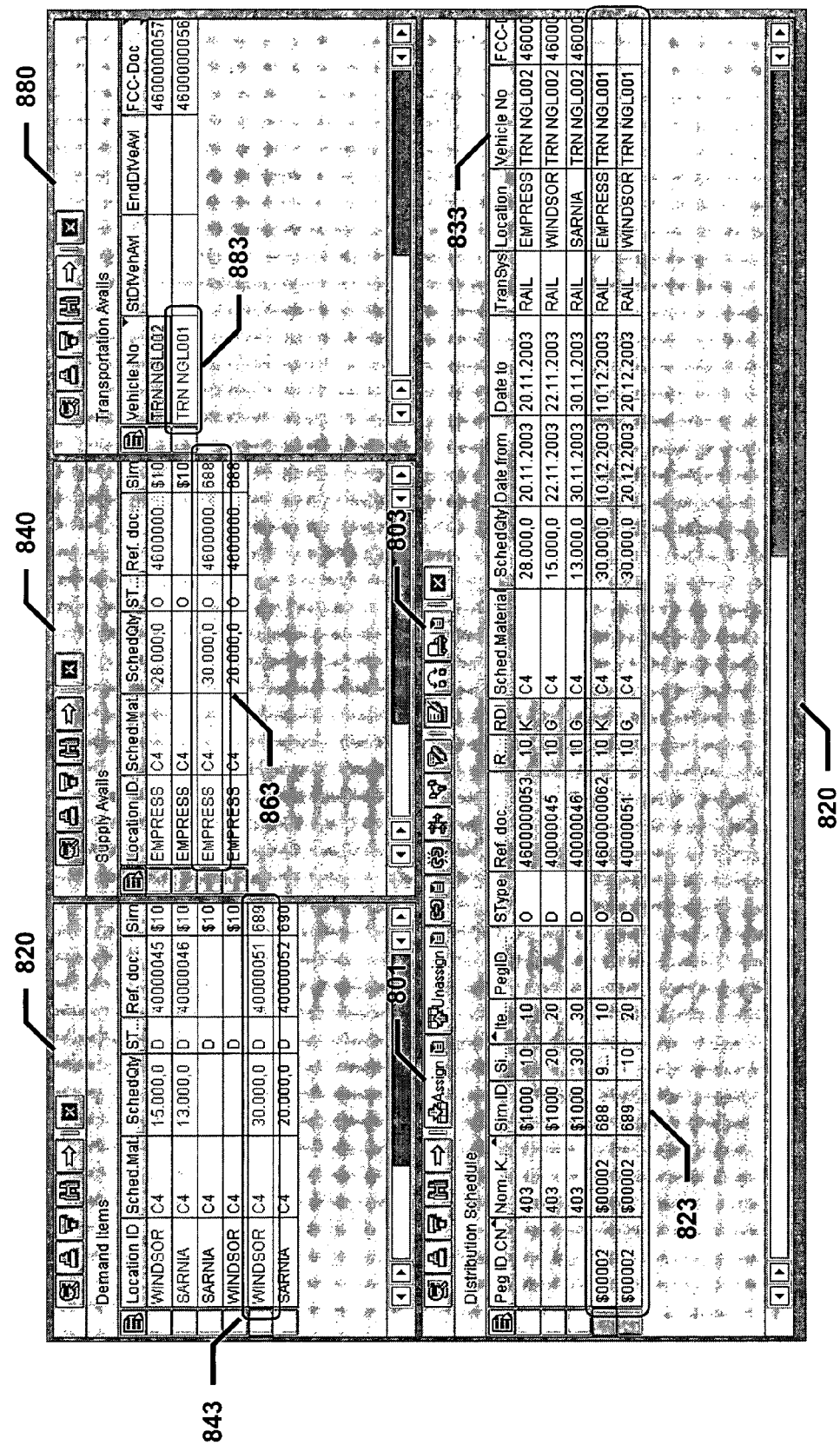

Referring to FIG. 8, distribution scheduling interface 800 may include, for example, distribution schedule window 820, demand window 840, supply window 860 and transportation window 880, similar to the embodiments depicted, generally, within FIGS. 5-7. In one embodiment, a transportation resource may now be assigned, although the transportation resource may have been assigned at the same time that the supply and demand resources were assigned, as noted above. For example, the scheduler may select voyage 823 within distribution schedule window 820, then select transport avail 883 within transportation window 880, and finally select the manual pegging icon 801 to peg, or assign, transportation avail 883 to voyage 823. In an embodiment, data checks may be performed by scheduling system 100 to ensure consistency with demand item 843 and supply avail 863. It may be noted that the vehicle number associated with transportation avail 863 is now indicated within the vehicle identifier field 833 of each row of voyage 823 (i.e., "TRN NGL001"). Of course, and as depicted within FIG. 8, multiple voyages may be included within a distribution schedule.

In an embodiment, the scheduler may then solicit approval, or confirmation, of the distribution schedule from the various partners involved in each voyage, e.g., supply partners 120, transportation partners 130, demand partners 140, etc., by "nominating" the participation of each partner in each voyage. Nominations may be based upon the characteristics of each voyage within the distribution schedule, and each partner may agree to the proposed participation level, reject the proposed participation level, or offer a modified participation level to the scheduler. Nominations may be transmitted electronically (e.g., electronic mail, electronic document exchange, etc.) to the relevant partners, over network 110, and responses may be similarly received. Alternatively, other means of communication may be employed (e.g., facsimile, regular mail, telephone, etc.).

For example, the scheduler may create a voyage specifying that 30,000 barrels of C4 material should originate from the "EMPRESS" location on a particular date (i.e., voyage 823 including supply avail 863). The scheduler may then send a nomination to the supply partner associated with supply avail 863 requesting participation according to the specifics of the voyage. The supply partner may accept, reject, or modify the nomination, for example, by proposing to provide a lesser quantity of material, e.g., 20,000 barrels, at that location and on that date.

After creating the distribution schedule, in an embodiment, the scheduler may select one or more voyages, displayed within distribution schedule window 820, and then select publish icon 803. In response, in one embodiment, scheduling system 100 may present a nomination interface to the scheduler to receive additional nomination information. Alternatively, in another embodiment, scheduling system 100 may invoke a background nomination process which may not require additional input from the scheduler. Scheduling system 100 may also create one or more nomination items, associated with the selected voyage(s), and store then the nomination item(s) within database 108.

Figure 9:
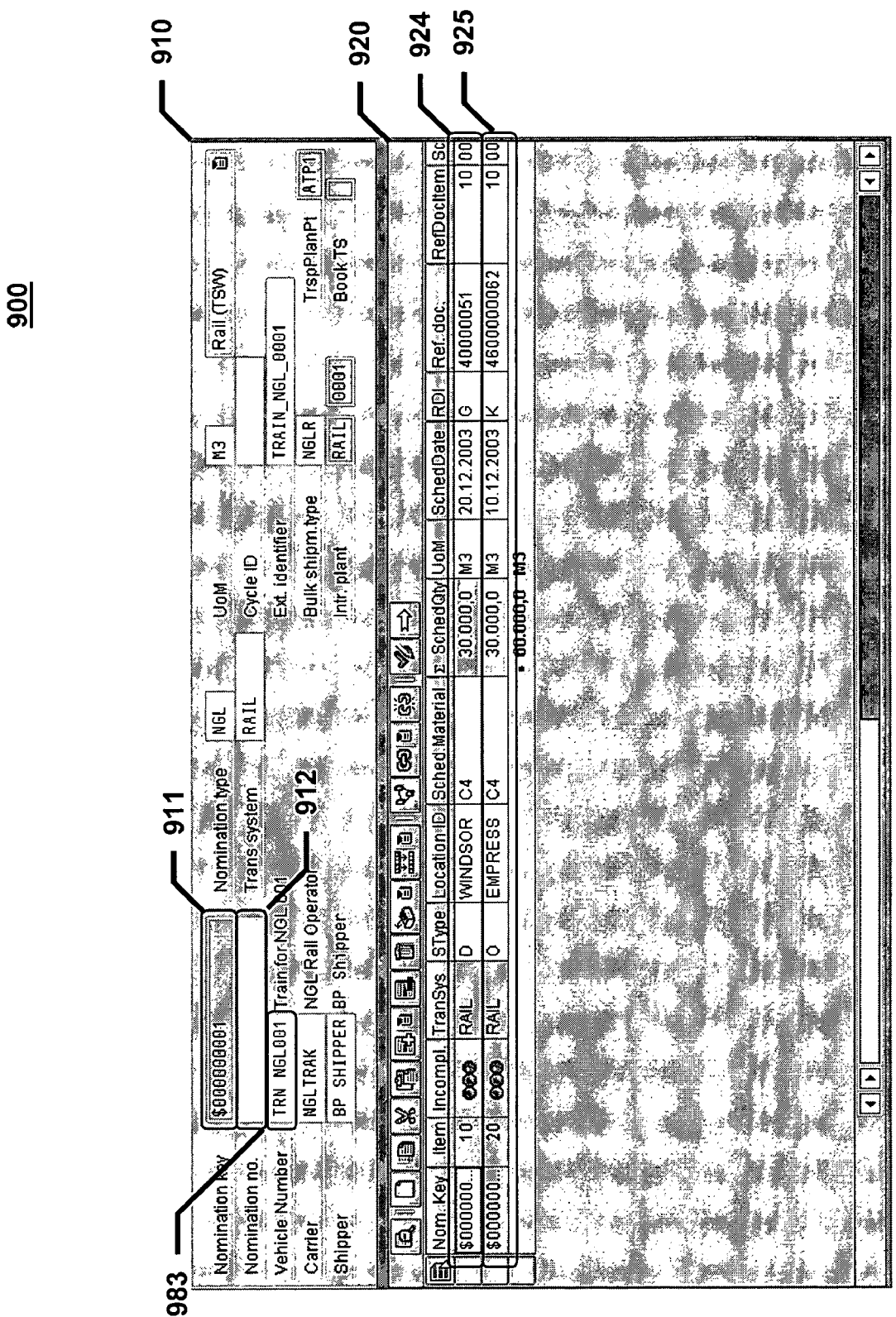
FIGS. 9-10 are detailed diagrams illustrating a nomination interface, according to an embodiment of the present invention.
Figure 10:
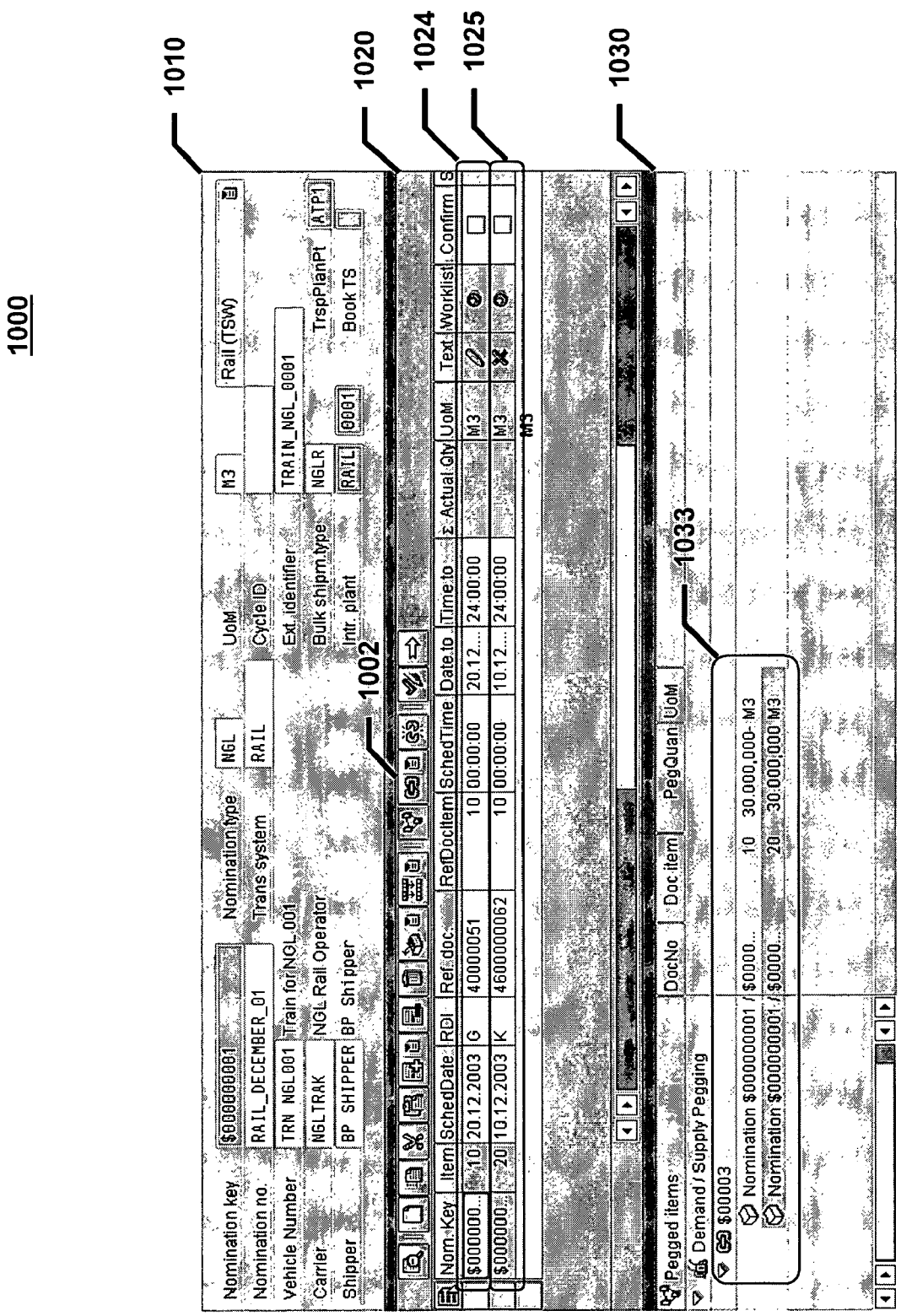

FIGS. 9-10 are detailed diagrams illustrating a nomination interface, according to an embodiment of the present invention.

With reference to FIG. 9, in an embodiment, nomination interface 900 may include nomination information window 910 and nomination item window 920. Nomination information window 910 may include nomination data associated with the previously selected voyage, such as, for example, nomination key 911, nomination identifier 912, vehicle identifier 983, etc. Nomination item window 920 may display nomination items associated with previously selected voyages. For the purposes of illustration, a single voyage may be selected (e.g., voyage 823), so that nomination information window 910 may display information associated with that particular voyage (i.e., voyage 823) and nomination item window 920 may display associated nomination items (e.g., demand nomination item 924, supply nomination item 925).

In this example, voyage 823 includes transport avail 883 having a particular vehicle identifier (i.e., "TRN NGL001") which may be displayed as vehicle identifier 983 within nomination information window 910. Nomination identifier 912 may represent the name by which the voyage is typically known amongst the partners involved, and may be manually entered by the scheduler, or, alternatively, automatically generated by scheduling system 100. For example, the scheduler may choose to name voyage 823 "RAIL_DECEMBER_01", and may enter this name into nomination identifier 912. Prior to confirmation, nomination key 911 may include a simulated key, indicated, for example, by a numeric designator having a leading "$," which may be replaced by a real key after confirmation of the nomination. Generally, confirmation refers to acceptance of the terms of the nomination by the various partners associated with the voyage (e.g., supply partner(s), demand partner(s), transportation partner, etc.). In one embodiment, the scheduler may manually confirm the nomination, while in another embodiment, scheduling system 100 may automatically confirm the nomination based on electronic information received from each partner over network 110.

With reference to FIG. 10, in an embodiment, nomination interface 1000 may include nomination information window

1010, nomination item window 1020, as well as pegged item window 1030. Generally, nomination items may include both demand nomination items and supply nomination items, and these nomination items may be specifically pegged together. For example, demand nomination item 1024 and supply nomination item 1025 may be associated with demand item 843 and supply avail 863, respectively, of voyage 823. The scheduler may select demand nomination item 1024 and supply nomination item 1025, and then select demand-supply pegging icon 1002 to peg these nomination items together. Pegged item window 1030 may display pegged item 1033, representing pegged demand nomination item 1024 and supply nomination item 1025. Additionally, changes made by the scheduler to demand nomination item 1024 and supply nomination item 1025 may be reflected within demand item 843 and supply avail 863, respectively.

Importantly, in an embodiment, scheduling system 100 may support multiple, concurrent users, or schedulers. Consequently, several schedulers may attempt to create distribution schedules including voyages that nominate the same available resources, i.e., the same available demand objects, the same available supply objects, the same available transportation objects, etc. For example, during the scheduling and nomination process, schedulers may peg supply objects to demand objects, split supply and demand object quantities over multiple parcels, assign a portion of the capacity of a transportation object to a particular voyage, etc., and, generally, modify the state of the available supply, demand and transportation objects within database 108. Without appropriate restrictions, data incoherency may result. Accordingly, in one embodiment, scheduling system 100 may create a lock object to preserve the integrity of the data stored within database 108.

In an embodiment, the lock object may include an identification of one or more data structures, or database tables and related fields, over which the lock object may operate. In another embodiment, the lock object may include an identification of one or more classes and related data, or one or more business objects and related data, over which the lock object may operate. For example, a lock object may be associated with one, or more, nomination items which may be associated with one or more voyages, each consisting of one or more pegged supply, demand and transportation objects. A lock object may be stored, for example, in a lock table within memory 104.

FIG. 11 is a top level flow diagram illustrating a method for locking a nomination item in a multi-user distribution scheduling system, according to an embodiment of the present invention.

At least one nomination item, associated with a voyage, may be created (1100) and stored (1110) in a database. As discussed above with reference to FIGS. 3-5, a plurality of demand, supply and transportation objects may be entered into database 108, from which a plurality of available demand, supply and transportation objects may be identified based upon a database search using availability criterion, such as dates, material types, locations, etc. The available demand, supply and transportation objects may then be presented to a user, or scheduler, using a graphical interface, for selection.

As discussed above with reference to FIGS. 6-8, the scheduler may select one or more demand objects, from the available demand objects presented within demand window 640 of distribution scheduling interface 600, to begin scheduling a voyage. The scheduler may then select one or more supply objects to match the various characteristics identified within the selected demand object, such as material type, quantity, etc. The selected demand and supply objects may be pegged prior to the selection, and subsequent pegging, of an available transportation object, or, an available transportation object may be selected prior to simultaneously pegging all three selected objects. The scheduler may select a transportation object to match the various characteristics identified within the selected demand and supply objects, such as material type, quantity, etc. The selected supply object, the selected demand object and the selected transportation object may then be pegged to create a voyage having an associated distribution schedule object.

In an embodiment, the scheduler may then select one or more voyages, displayed within distribution schedule window 820, and select publish icon 803. In response, scheduling system 100 may create (1100) at least one nomination item associated with the selected voyage, store (1110) the nomination item within database 108, and, in one embodiment, present nomination interface 900 to the scheduler to receive additional nomination information, modifications, etc. The nomination item may be a demand nomination item (e.g., demand nomination item 924), which may be correspond to a demand object of the associated voyage (e.g., demand item 843 of voyage 823), or a supply nomination item (e.g., supply nomination item 1025), which may correspond to a supply object of the associated voyage (e.g., supply avail 863 of voyage 823). Typically, the associated voyage may include both a demand object and a supply object, so that both a demand nomination item and a supply nomination item may be created (1100) and stored (1110) within database 108.

The nomination item may then be modified (1120) by the scheduler. The modifications to the nomination item may not yet be committed to database 108, and may be held in a temporary data structure pending the outcome of the creation of the lock object.

A lock object, associated with the nomination item, may be created (1130). In one embodiment, the lock object may be created (1130) when nomination interface 900 is presented to the scheduler (e.g., early lock), while in another embodiment, the lock object may be created (1130) in response to an update, or save, command selected by the scheduler after the nomination item has been modified (e.g., late lock). Once created, the lock object may be stored within a lock table in memory 104. As discussed above, the lock object may be associated with at least one nomination item, which may be a supply nomination item associated with an available supply object, a demand nomination item associated with an available demand object, or other data. While one scheduler may be modifying a particular nomination item, and, consequently, the corresponding supply, demand or transportation data associated with that particular nomination item, the remaining schedulers may be prevented from storing modifications to these data by the lock object.

The nomination item may be stored (1140) in the database. In an embodiment, after the lock object has been created (1130), the modified nomination item may be stored (1140) within database 108 in response to an update, or save, command selected by the scheduler. The associated demand, supply or transportation data may also be modified accordingly. The lock object associated with the nomination item may then be deleted (1150) from the lock table. A discussion of several aspects of multi-user scheduling follows.

A concurrent scheduler may select (1105) a nomination item already stored within database 108, modify (1122) the nomination item, and then attempt to store (1140) the modified nomination item within database 108. However, in the late lock embodiment, just prior to the store attempt, scheduling system 100 may query the lock table to determine (1125) whether a lock associated with that particular nomination item exists. If an associated lock does exist, then the concurrent scheduler may be prevented from saving the modifications to that particular nomination item. If an associated lock does not exist, then the concurrent scheduler may be permitted to store (1140) the modifications to that particular nomination item.

However, scheduling system 100 may first perform a database read for that particular nomination item to detect (1135) whether concurrent changes have been made to that particular nomination item, such as, for example, modifications stored by the first scheduler. If no concurrent changes are detected (1135), then the nomination item may be stored (1140) within database 108. However, if concurrent changes are detected (1135), then the concurrent scheduler's modification may not be stored (1140). In either case, the lock object may then be deleted (1150) from the lock table.

In an example, a first scheduler may create, select and then publish voyage 823, thereby creating demand nomination item 924 and supply nomination item 925, which the first scheduler may wish to modify. Concurrently, a second scheduler may select (1105) supply nomination item 925 for modification purposes, such as to reduce the scheduled quantity of supply avail 863 for application to a different voyage, for example. In the late lock embodiment, first scheduler chooses to save his modifications to supply nomination item 925 just before the second, concurrent scheduler, so scheduling system 100 queries the lock table, determines (1125) that an associated lock object does not exist, creates (1130) the associated lock object in the lock table, fails to detect (1135) a concurrent change to supply nomination object 925 within database 108, stores (1140) supply nomination object 925 within database 108 and then deletes (1150) the associated lock object from the lock table.

In a further example, the second, concurrent scheduler chooses to save his modifications to supply nomination item 925 while the associated lock object (created by the first scheduler) is stored within the lock table. Scheduling system 100 may determine (1125) that the associated lock object is stored within the lock table, and may prevent the second, concurrent scheduler from storing his modifications to supply nomination item 925. In another example, the second, concurrent scheduler chooses to save his modifications to supply nomination item 925 after the associated lock object has been deleted (1150) from the lock table. However, in this example, scheduling system 100 may detect (1135) a concurrent change to supply nomination object 925 within database 108, because the value of supply nomination object 925 has changed during the time that the second, concurrent scheduler made his modification, i.e., e.g., from an initial value to a changed value reflective of the first scheduler's modification to database 108. In the early lock embodiment, however, the scheduler that accesses the nomination item first retains indefinite control, through the lock object and lock table, until his modifications are saved, or committed to database 108.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for locking a nomination item in a multi-user distribution scheduling system, comprising:
concurrently presenting on a display of a computer system:
a list of supply objects that model quantities of goods offered for sale by various sellers, supply object(s) to be included in a voyage;
a list of demand objects that model quantities of goods desired for purchase by various buyers, demand object(s) to be included in the voyage; and
a list of transportation objects that model delivery resources available from various transporters, transportation object(s) to be used for the voyage;
responsive to user control, creating at least one nomination item associated with a voyage, the voyage including at least one supply object(s) selected from the list of supply objects, at least one demand object(s) selected from the list of demand objects and at least one transportation object(s) selected from the list of transportation objects;
storing the nomination item in a database;
modifying the nomination item by a first process;
in response to the modifying, creating a lock object, associated with the nomination item, to prevent concurrent modifications by a second process of the nomination item and any one of the supply, demand and transportation data associated with the nomination item;
requesting, by the second process, a save operation to be performed to save the modification to the nomination item made by the second process prior to a request to perform a save operation by the first process;
in response to the requesting to save, determining whether a lock object has been created for the nomination item;
if a lock object is determined to exist, preventing the storing of the modification made to the nomination item by the second process;
storing the nomination item modified by the first process in the database; and
deleting the lock object.

2. The method of claim 1, wherein:
said at least one nomination item includes a supply nomination item associated with the selected supply object and a demand nomination item associated with the selected demand object.

3. The method of claim 2, wherein said concurrent modification includes:
concurrent modification of the selected supply object associated with the supply nomination item.

4. The method of claim 2, wherein said concurrent modification includes:
concurrent modification of the selected demand object associated with the demand nomination item.

5. The method of claim 1, wherein said creating the lock object includes:
storing the lock object in a lock table in a memory.

6. The method of claim 5, wherein said deleting the lock object includes:
deleting the lock object from the lock table in the memory.

7. The method of claim 1, further comprising:
selecting the nomination item;
determining whether the lock object associated with the nomination item is already stored in a lock table; and
if so determined, preventing said creating the lock object, said storing the modified nomination item and said deleting the lock object.

8. The method of claim 1, further comprising:
reading the database to detect concurrent changes to the nomination item; and
if so detected, preventing said storing the modified nomination item in the database.

9. A computerized method for locking objects in a multi-user distribution scheduling system, comprising:
concurrently presenting on a display of a computer system:
a list of supply objects that model quantities of goods offered for sale by various sellers, supply object(s) to be included in a voyage;
a list of demand objects that model quantities of goods desired for purchase by various buyers, demand object(s) to be included in the voyage; and
a list of transportation objects that model delivery resources available from various transporters, transportation object(s) to be used for the voyage;
responsive to user control during a first process, creating a data object that links at least one supply object(s), at least one demand object(s), and at least one transportation object(s) selected from the respective lists for the voyage to one another;
locking the supply object(s), the demand object(s), and the transportation object(s) of the created data object to prevent them from being selected for another voyage executed by a second process, while the lock persists, wherein the lock is indicated by a lock object;
requesting, by the second process, a save operation to be performed to save the modification to the supply object(s), the demand object(s), and the transportation object(s) made by the second process prior to a request to perform a save operation by the first process;
in response to the requesting to save, determining whether a lock object has been created for the supply object(s), the demand object (s), and the transportation object(s); and
publishing notices of the selected supply object(s), the demand object(s), and the transportation object(s) to entities associated therewith to request approval for inclusion of the respective supply object(s), the demand object(s), and the transportation object(s) in the voyage.

10. The method of claim 9, wherein the lock is applied to the supply object(s), the demand object(s), and the transportation object(s) when the data object is created.

11. The method of claim 9, wherein the lock is applied to the supply object(s), the demand object(s), and the transportation object(s) when the notices are published.

12. The method of claim 9, wherein the lock is released when at least one of the entities is rejected the request for inclusion.

13. The method of claim 9, further comprising:
detecting if any of the supply object(s), the demand object(s), and the transportation object(s) has already been locked by a different nomination process;
if so, disallowing the locked object(s) from being included in the voyage.

14. A multi-user distribution scheduling system using an object locking process, comprising:
a processor; and
a memory, coupled to the processor, including instructions adapted to be executed by the processor to perform a method for scheduling delivery of goods using a nomination process, the method comprising:
concurrently presenting on a display of a computer system:
a list of supply objects that model quantities of goods offered for sale by various sellers, supply object(s) to be included in a voyage;
a list of demand objects that model quantities of goods desired for purchase by various buyers, demand object(s) to be included in the voyage; and
a list of transportation objects that model delivery resources available from various transporters, transportation object(s) to be used for the voyage;
responsive to user control during a first process, creating a data object that links at least one supply object(s), at least one demand object(s), and at least one transportation object(s) selected from the respective lists for the voyage to one another;
locking the supply object(s), the demand object(s), and the transportation object(s) of the created data object to prevent them from being selected for another voyage executed by a second process, while the lock persists, wherein the lock is indicated by a lock object;
requesting, by the second process, a save operation to be performed to save the modification to the supply object(s), the demand object(s), and the transportation object(s) made by the second process prior to a request to perform a save operation by the first process;
in response to the requesting to save, determining whether a lock object has been created for the supply object(s), the demand object (s), and the transportation object(s);
and
publishing notices of the selected supply object(s) the demand object(s), and the transportation object(s) to entities associated therewith to request approval for inclusion of the respective supply object(s), the demand object(s), and the transportation object(s) in the voyage.

15. A computer readable medium including instructions adapted to be executed by a processor to perform a method for locking objects in a multi-user distribution scheduling system, the method comprising:
concurrently presenting on a display of a computer system:
a list of supply objects that model quantities of goods offered for sale by various sellers, supply object(s) to be included in a voyage;
a list of demand objects that model quantities of goods desired for purchase by various buyers, demand object(s) to be included in the voyage; and
a list of transportation objects that model delivery resources available from various transporters, transportation object(s) to be used for the voyage;
responsive to user control during a first process, creating a data object that links at least one the supply object(s), at least one the demand object(s), and at least one the transportation object(s) selected from the respective lists for the voyage to one another;
locking the supply object(s), the demand object(s), and the transportation object(s) of the created data object to prevent them from being selected for another voyage executed by a second process, while the lock persists, wherein the lock is indicated by a lock object;
requesting, by the second process, a save operation to be performed to save the modification to the supply object(s), the demand object(s), and the transportation object(s) made by the second process prior to a request to perform a save operation by the first process;

in response to the requesting to save, determining whether a lock object has been created for the supply object(s), the demand object (s), and the transportation object(s); and publishing notices of the selected supply object(s) the demand object(s) and the transportation object(s) to entities associated therewith to request approval for inclusion of the respective supply object(s), the demand object(s), and the transportation object(s) in the voyage.

16. A method for locking a nomination item in a multi-user distribution scheduling system, comprising:

modifying a nomination item by a first process;

concurrently modifying the nomination item by a second process;

requesting, by the second process, a save operation to be performed to save the modifications to the nomination item made by the second process prior to a request to perform a save operation by the first process;

in response to the requesting to save, determining whether a lock object has been created for the nomination item;

if a lock object has been created for the nomination item in response to the modifying by the first process, prevent the second process from saving the modifications made by the second process;

if a lock object has not been created, create a lock object for the nomination item modified by the second process to prevent the saving of the modifications made by the first process;

determine if concurrent changes have been made to the nomination item;

if no concurrent changes have been made to the nomination item, saving the nomination item modified by the process that caused the creation of the lock object; and delete the lock object after the saving.

17. The method of claim 16, wherein the nomination item includes at least one of a supply nomination, a demand nomination, and a transportation nomination, the supply nomination representing the selection of a quantity of materials to be provided by a supplier, the demand nomination representing the selection of a demand by a demand partner for the selected quantity of materials to be provided by the supplier, and the transportation nomination representing the selection of a transportation medium for transporting the selected quantity of material from the supplier to the demand partner.

* * * * *